United States Patent
Allouche et al.

(10) Patent No.: US 9,464,619 B2
(45) Date of Patent: Oct. 11, 2016

(54) ROTATING HOUSING TURBINE

(71) Applicant: Louisiana Tech Research Foundation; A Division of Louisiana Tech University Foundation, Inc., Ruston, LA (US)

(72) Inventors: Erez Allouche, Madison, MS (US); Arun P. Jaganathan, Ruston, LA (US)

(73) Assignee: Louisiana Tech Research Corporation, Ruston, LA (US)

( * ) Notice: Subject to any disclaimer, the term of this patent is extended or adjusted under 35 U.S.C. 154(b) by 595 days.

(21) Appl. No.: 13/866,133

(22) Filed: Apr. 19, 2013

(65) Prior Publication Data

US 2013/0230380 A1    Sep. 5, 2013

Related U.S. Application Data (63) Continuation of application No. PCT/US2011/055899, filed on Oct. 12, 2011.

(60) Provisional application No. 61/484,842, filed on May 11, 2011, provisional application No. 61/405,985, filed on Oct. 22, 2010.

(51) Int. Cl.
*F03B 3/04* (2006.01)
*F01D 5/03* (2006.01)

(52) U.S. Cl.
CPC . *F03B 3/04* (2013.01); *F01D 5/03* (2013.01); *Y02B 10/30* (2013.01)

(58) Field of Classification Search
CPC .................................. F01D 5/03; F03B 3/04
USPC .......... 415/1, 3.1, 4.5, 182.1, 183, 905, 906, 415/908; 29/54
See application file for complete search history.

(56) References Cited

U.S. PATENT DOCUMENTS

| | | | |
|---|---|---|---|
| 649,065 A | 5/1900 | Martens | |
| 2,509,442 A | 5/1950 | Matheisel | |
| 4,272,685 A * | 6/1981 | Toyama | 290/52 |
| 4,648,788 A | 3/1987 | Jochum | |
| 5,167,483 A * | 12/1992 | Gardiner | 415/3.1 |
| 6,957,947 B2 * | 10/2005 | Williams | 415/4.3 |
| 7,190,088 B2 * | 3/2007 | Heidel | F03B 13/00 290/43 |
| 7,501,712 B2 | 3/2009 | Bolyard | |
| 8,558,424 B2 * | 10/2013 | Auten | F03B 13/10 310/90.5 |
| 2005/0005592 A1 | 1/2005 | Fielder | |
| 2007/0216245 A1 | 9/2007 | Fielder | |

FOREIGN PATENT DOCUMENTS

| | | |
|---|---|---|
| CA | 2352673 A1 | 1/2003 |
| GB | 2426554 A | 11/2006 |

OTHER PUBLICATIONS

Storm Water FAQs, North Carolina Department of Environment and Natural Resources, 2006.*
PCT/US2011/055899, US International Searching Authority, PCT Search Report and Written Opinion dated Mar. 21, 2013, 9 pages.

* cited by examiner

*Primary Examiner* — Woody Lee, Jr.
(74) *Attorney, Agent, or Firm* — Jones Walker LLP (57) ABSTRACT

The invention is a new turbine structure having a housing that rotates. The housing has a sidewall, and turbine blades are attached to a sidewall portion. The turbine may be completely open in the center, allowing space for solids and debris to be directed out of the turbine without jamming the spinning blades/sidewall. The turbine may be placed in a generator for generation of electrical current.

7 Claims, 7 Drawing Sheets

ROTATING HOUSING TURBINE

PRIORITY CLAIM

This application is a continuation of PCT/US11/55899 filed Oct. 12, 2011, which claims the priority benefit of U.S. provisional application No. 61/484,842 filed May 11, 2011, and U.S. provisional application No. 61/405,985 filed on Oct. 22, 2010, all of which are incorporated herein by reference in their entirety.

FEDERAL FUNDING

The research on aspects of this invention was undertaken under Department of Energy Contract number DE-SC0001698. The U.S. government may have rights in the invention as specified in that contract.

BACKGROUND OF THE INVENTION

Typical turbines are machines that convert fluid motion flowing through the turbine into rotary mechanical motion. Turbines typically have a rotatable center shaft that has rotors or blades or fins attached on the shaft (sometimes referred to as propellers, typically for wind turbines) (hereafter, "blades"). The blades can be encased in a housing or shroud, typically in a reaction turbine.

Fluid flow across the blades imparts a torque action on the blades, thereby causing the shaft to spin, and leaves the fluid flow with diminished kinetic energy exiting the turbine. Typically, these turbines are considered as an impulse turbines, as there is no substantial pressure change of the fluid or gas in the turbine blades. In a reaction turbine, a housing is used to contain and direct the working fluid. Reaction turbines develop torque by reacting to the fluid's pressure or mass. The pressure of the fluid usually changes as it passes through the turbine rotor blades. A housing is not required if the turbine is fully immersed in the fluid flow (such as with river or ocean turbines).

The rotary mechanical motion of a turbine can be converted into electrical power. For instance, if the center shaft is magnetic (or has magnets attached) and the center shaft spins in an armature or windings, then the turbine is structured as part of a generator. The center shaft turbine is not suited to interact with fluids having particulate or other solids within the fluid, as the solids can become trapped between the spinning blades, jamming the turbine and impeding rotary motion.

SUMMARY OF THE INVENTION

The inventors have discovered a new turbine structure (referred to as a rotating housing turbine) where the blades are attached to a side wall portion, and the sidewall itself rotates or spins. The turbine, in one embodiment, is open in the center, allowing space for solids and debris to be directed out of the turbine without jamming the spinning blades/sidewall. Included in the invention is the use of the turbine in a generator.

DESCRIPTION OF THE PREFERRED EMBODIMENT

Figure 1:
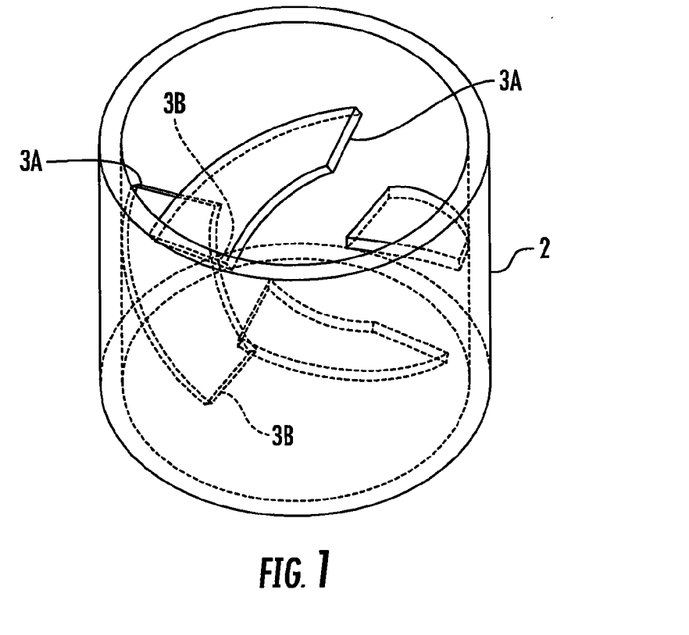
FIG. 1 is a ghost perspective view of one embodiment of the invention.
Figure 2:
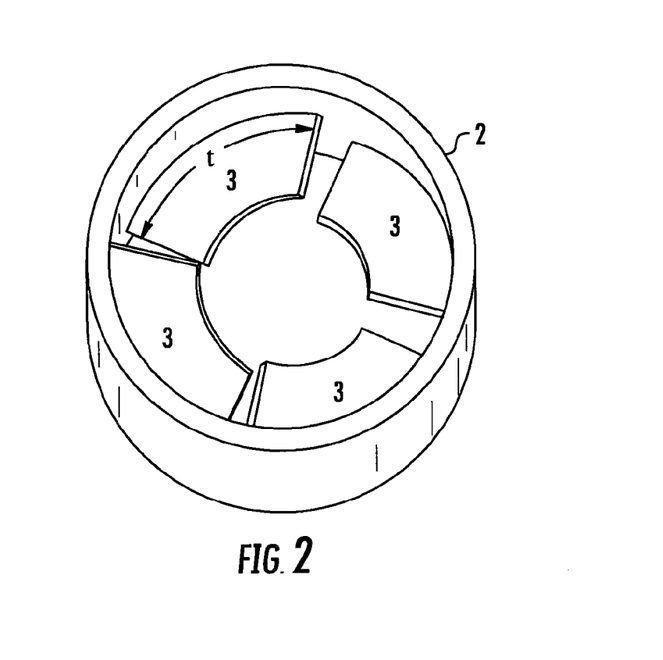
FIG. 2 is a top perspective view of the embodiment of FIG. 1.
Figure 4:
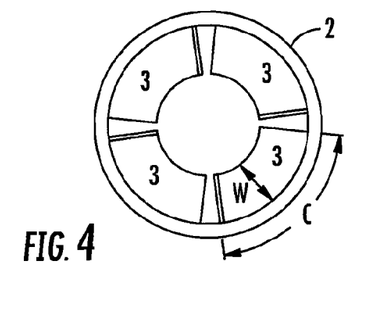
FIG. 4 is a top view of the turbine of FIG. 3.
Figure 6:
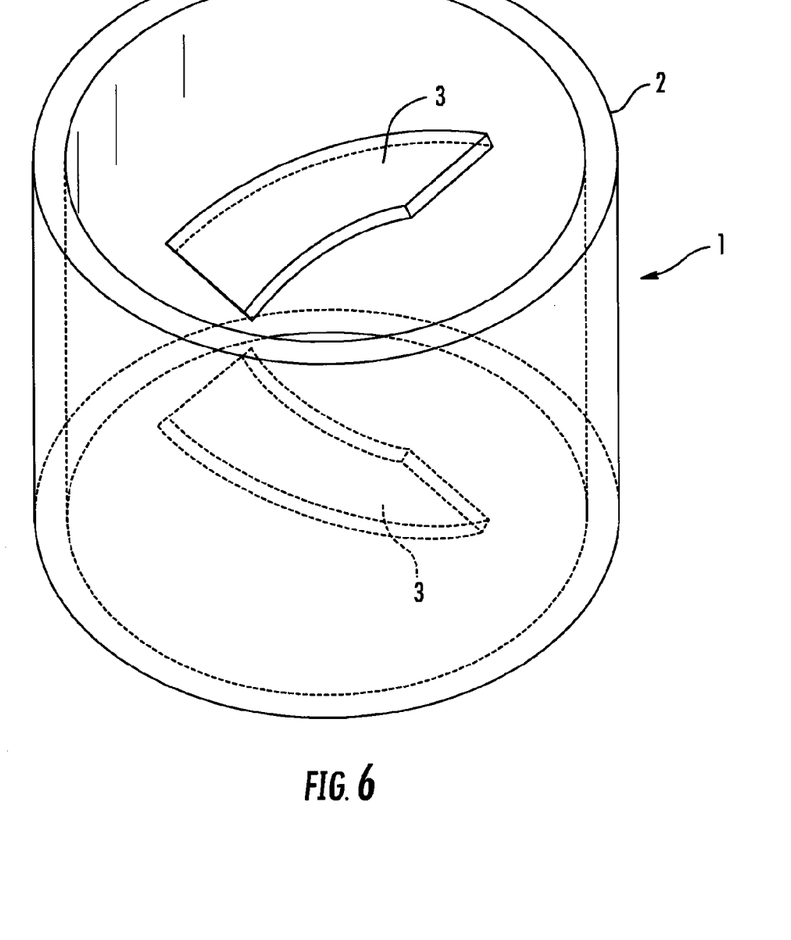
FIG. 6 is a top perspective view of another embodiment of the invention.

A sample turbine is shown in the prospective ghost view of FIG. 1. As shown, the turbine 1 has a tubular shaped sidewall 2 (here a cylinder), and a series of blades 3 (four blades are depicted, a two bladed configuration is shown in FIG. 6) attached to the interior surface of the sidewall. Each blade has a beginning edge 3A and a terminating edge 3B. Each blade 3 is curved to follow the inner surface of the sidewall, but spirals or winds downwardly on the interior surface of the sidewall at a spiral angle (which may vary) (a horizontal cross section through the housing and blade, the blade will intersect the cross-section and sidewall at an angle, the spiral angle). Spiral angles can vary based upon flow through the turbine, and turbine characteristics, from about 10 degrees (little winding) to almost 170 degrees (almost vertical). In the embodiment shown, the spiral angle is about 30 degrees. As shown in FIG. 4, each blade 3 horizontally extends partially around the interior surface of the sidewall, here extending a distance "C" around the circumference of the sidewall—in this embodiment of FIG. 4, C is about a quadrant, or 90 degrees, as shown in FIG. 4. As shown, multiple blades are employed. A single blade turbine is also within the scope of the invention, but is not preferred due to the non-balanced nature of the housing.

Figure 3:
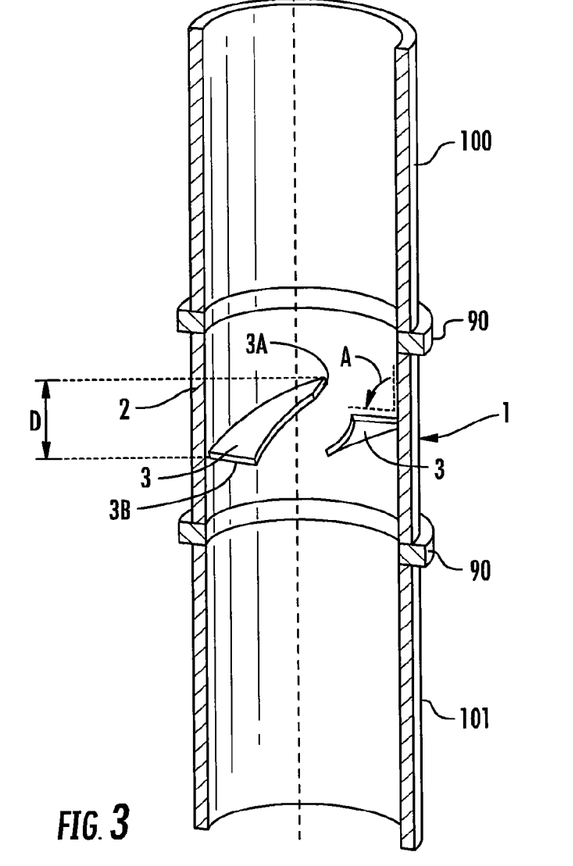
FIG. 3 is a cross section of the embodiment of the invention of FIG. 1 in place in a vertical section of piping.

The particular turbines 1 shown in FIGS. 1, 2, 3 and 4 was designed to be positioned vertically in a vertical sewer drop structure, as later described. Consequently, "vertical" is in reference to the axis V of the sidewall parallel to or along the sidewall, as shown in FIG. 3. The sewer drop structure for use with this particular turbine has about five feet of vertical extent, and the design employs a single turbine within the structure. For this particular application, with the sewer drop line of about four inches in diameter, the turbine 1 has an inner diameter of about 4 inches and the blade width "W" is about 1 inch. As shown, the width is constant, but this is not required.

For the turbine of FIG. 1, the vertical extent "D" of a blade is about one inch (the vertical separation of the beginning edge 3A from the terminating edge 3B—see FIG. 3), i.e., beginning edge 3A of each blade is separated from the bottom edge 3B of each blade 3 by about one inch along the lengthwise of "vertical" axis of the sidewall. Each blade has a length "L" measured along the interior surface of the sidewall, and for this particular application, the length is about three inches. As can be seen, the length of a blade L will preferably exceed the vertical extent D and the horizontal extent C of a blade. Additionally, for the sewer drop structure application, a preferred blade orientation is an angle "A" substantially perpendicular to the sidewall (see FIG. 3). Orientation of a blade with respect to the sidewall is defined with respect to a plane cutting the cylinder lengthwise, where the plane is parallel to the longitudinal axis and extending through the center axis of the cylinder, where the plane also intersects a blade. This plane will intercept the blade in a line segment. That line segment forms an angle "A" in the plane with respect to the line segment formed by the intersection of the plane and the housing sidewall—the angle between these two line segments is the angle of the blade with respect to the sidewall. Embodiments incorporating blade orientations other than perpendicular, such as +10 degrees to the vertical wall of the turbine (e.g., angle A between the sidewall and the tilt of a blade, measured from the top of the sidewall where fluid enters, is 10 degrees) to about to −20 to −30 degrees to the vertical wall of the turbine (e.g., angle A is about 110-120 degrees, as measured from the top of the sidewall where fluid enters the turbine). Other variations are within the scope of the invention. Typically, the orientation of each blade will be constant, but can vary down the blade length.

As shown, each of the four blade's beginning edge 3A is positioned at the same vertical position in the housing, but offset around the inner circumference of the sidewall. This is preferred when used in a fluid flow that "sheets" down the interior surface of the sidewall of the turbine, but the blades may start at different vertical positions along the vertical axis of the turbine.

Figure 5:
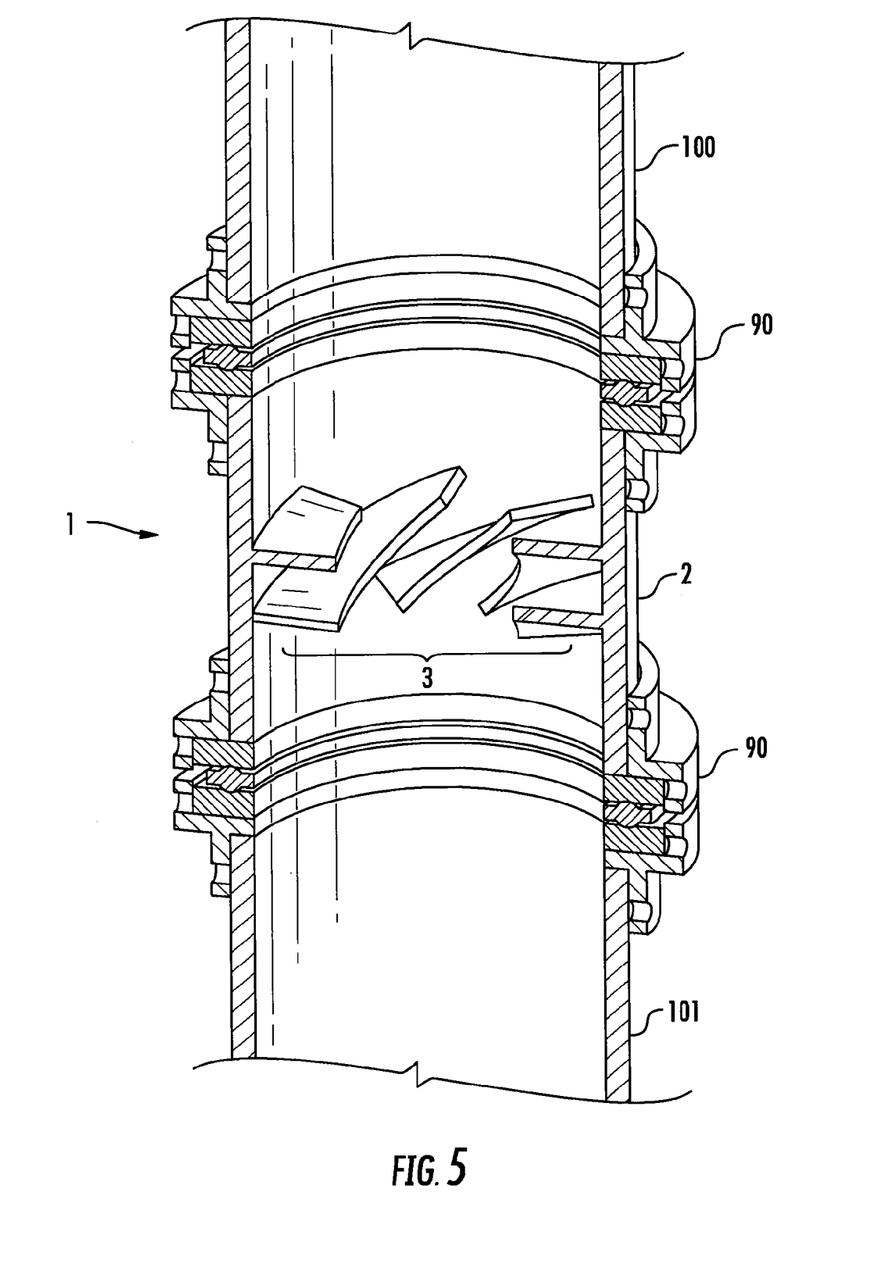
FIG. 5 is a cross section of another embodiment of the invention in place in a vertical section of piping.

An embodiment suitable for fluids with entrained solids or debris has each blade width W less than the radius of the surrounding cylindrical housing. Consequently, the center of the turbine in this embodiment is open or hollow, clear of any blade surface. In the embodiment shown in FIG. 1, the open turbine center forms a cylinder with a diameter of about two inches ("cylindrically shaped" includes variation, such as octagonal shaped sidewall, a pentagonal shaped sidewall, or other variations; the sidewall preferably will generally be symmetrically tubular to balance while rotating). This open center allows for solids and debris entrained in the fluid flow to be shed from the blades into the turbine center opening, thereby allowing potential obstructing material to pass through the turbine without jamming the turbine. The turbine, as shown, is to be mounted or suspended in a fixed structure, and rotatable about that fixed structure. For instance, the turbine might be mounted at the end of a fixed cylindrical structure, with a suitable bearing positioned between the turbine and the fixed structure. In a sewer drop structure, such as shown in FIG. 3, the turbine is mounted between an upper pipe section 100, and a lower pipe section 101, with bearings 90 positioned between, such as ball or thrust bearings (see FIG. 5). A bearing can be positioned in a cage, sleeve or other coupling to join the turbine to a respective pipe section, with the bearing positioned between the joined surfaces.

The diameter and length of the rotating housing, number of blades, the configuration of each blade (e.g., the coverage of each blade in degrees, or the horizontal extend D), whether the blades overlap, the amount of vertical extent of each blade (i.e., the vertical blade drop from the starting edge to terminating edge, "V"), the angle A of the blade with respect to the interior cylindrical wall, and the width W of the blade (e.g., how far into the cylinder each blade extends) can be modified in response to design criteria, such as the characteristics of the working fluid, the nature of any entrained solids, and the desired rotational speed of the turbine. Each blade may have different characteristics, but that is generally not preferred.

For instance, in a clean fluid application, the blade width W may exceed the radius of the housing cylinder. However, if safety of aquatic life (in a liquid application) or of birds or bats (in a gaseous application) are a concern, the open center turbine may be preferred. The rotating housing turbine may be mounted horizontally, for instance, in a river or channel application, or mounted at any angle. For instance, if placed in a river in order to generate electricity, the orientation of the turbine will preferably correspond to be inline or parallel with that of the current flow at the location of the turbine.

The rotating housing turbine is a self-cleaning, compact turbine design, with low profile blades, providing a minimal disruption to materials entrained in the fluid flow and is an efficient device for energy conversion. The rotating housing turbine may be integrated into an electrical generator as a rotor, and constructed for various materials inert to the working fluid. Polyvinyl chlorides (PVC) or other thermoplastics, fiberglass, or other polymeric material or composite materials, or metals, such as aluminum or stainless steel, for instance, can be utilized for both the turbine sidewall and blades. Lightweight materials are preferred, in order to increase the energy conversion efficiency of the turbine.

FIG. 3 shows the vortex turbine installed inline with a fluid feed line, such as a sewer drop structure. As shown, the rotating housing turbine is separated between two fixed pipe sections 100 (inlet pipe) and 101 (discharge pipe). Positioned between turbine and pipe sections, at the ends or edges of the sections, are bearings 90, such as ball bearings or thrust bearings. The bearings 90 allow the vortex turbine 1 to rotate in response to water flowing through the pipe sections, such as by sheeting and spiraling down the inner walls of the pipe. As shown, the sidewall 2 of the turbine aligns with the walls of the pipe, but this configuration is not required. For instance, the rotating housing turbine 1 could be rotatable on the exterior surface of the pipe sections, (or alternatively, on the interior surfaces of the pipe sections) with the bearings positioned between the interior surface of the turbine and the exterior surface of the pipe sections.

Figure 8:
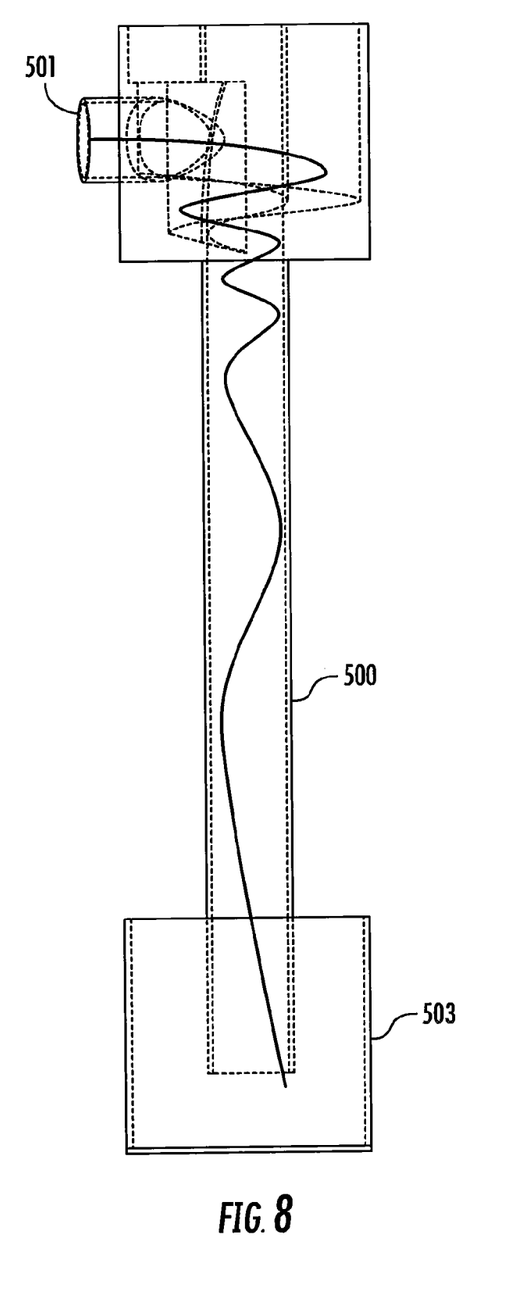
FIG. 8 is a cartoon depiction of a vortex structure in a sewer drop line, depicting fluid flow through the vortex structure.

Drop structures are used in wastewater conveyance systems where the sewage drops from a higher elevation to a lower elevation through a vertical shaft. There are thousands of sewer drop structures across North America ranging from 5 feet to over 300 feet in height, which convey flows of up to 4500 cu.ft. per second. The primary role of a drop structure (sometimes referred to as a vortex drop structure) is to transfer sewage from surface collection systems to deep tunnels (sometimes referred to as 'interceptors') that convey the water to a wastewater treatment facility and/or storage facility. Another benefit of the vortex drop structure is the elimination of odor found in the sewage by creating a downward suction through the center of the vortex structure that prevents gases from escaping the sewer environment, while infusing oxygen into the waste water stream. A vortex drop structure consists of a vertical shaft 500 with a "vortex generator" 501 at the top entrance and a water collection chamber 503 at the bottom of the shaft (shown diagrammatically in FIG. 8). The drop structure's shaft 500 is generally contained within a vertical concrete cylindrical sidewall enclosure, such as a basin (not shown, but see FIG. 3 of U.S. Pat. No. 6,419,843).

The vortex generator at the top of the drop structure is a device used to increase the tangential velocity component of the flow into the drop structure, so that, as the water drops down the shaft, it follows a spiral path along the wall of the shaft, leaving the center core of the shaft open. This arrangement creates a suction preventing the dissolved gases from escaping the flowing wastewater. One example of a vortex generator drop structure is shown in U.S. Pat. No. 6,419,843, hereby incorporated by reference. Incorporation of a rotating housing turbine into a drop structure will not compromise the original purpose of the drop structure, and the turbine presents only a minimal disruption to the flow. Furthermore, debris found in sewage should not create a blockage within the turbine itself. A conventional water turbine, such as Pelton turbine or a cross-flow turbine, positioned inside a drop structure is not efficient, as such turbines are designed for the flow having maximum velocity occurring along the center core of the conduit, whereas in the rotating housing turbine, the center core is vacant. Additionally, conventional turbines have multiple closely packaged blades, which are more susceptible to blockage by solids and debris. However, a rotating housing turbine geometry targets the spiral flow observed in vortex drop structures, and can be used as the rotator in a generator to generate electricity.

In use, the exterior surface of the vortex turbine can be used as part of a generator having a stationary portion (the stator) and a rotating housing used as the rotator. The turbine comprises the rotator, and may be lined with permanent magnets that will magnetically interact with the stator, a coiled armature, to generate current. The armature could alternatively be positioned on the exterior surface of the rotating housing turbine, and the magnets located on a stationary stator, but this is not preferred as an armature (such as an iron core armature) has considerably higher mass, and placing the lesser massive magnets on the rotating vortex turbine is preferred to achieve greater efficiency in the generator.

Figure 7:
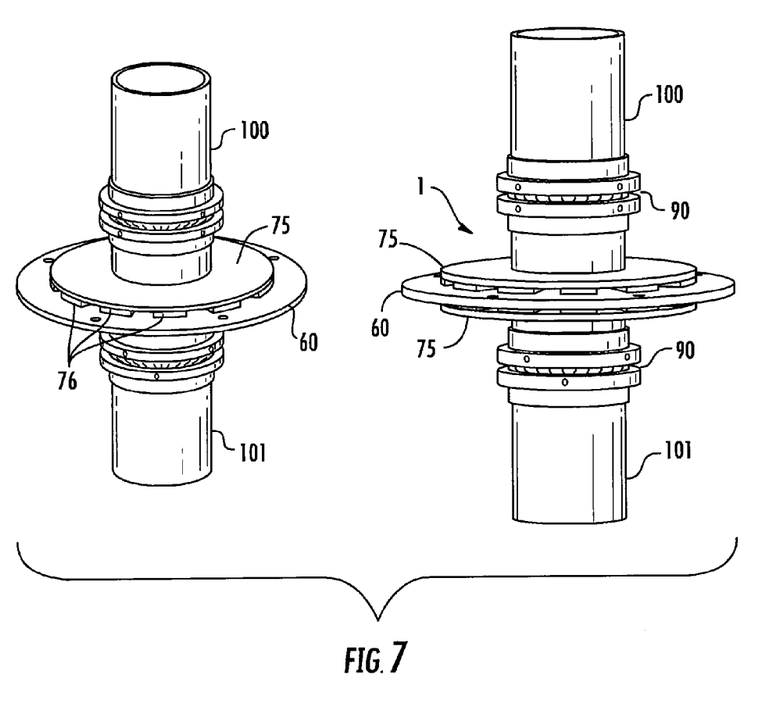
FIG. 7 is a perspective view of an embodiment of the invention in a generation assembly.
Figure 9:
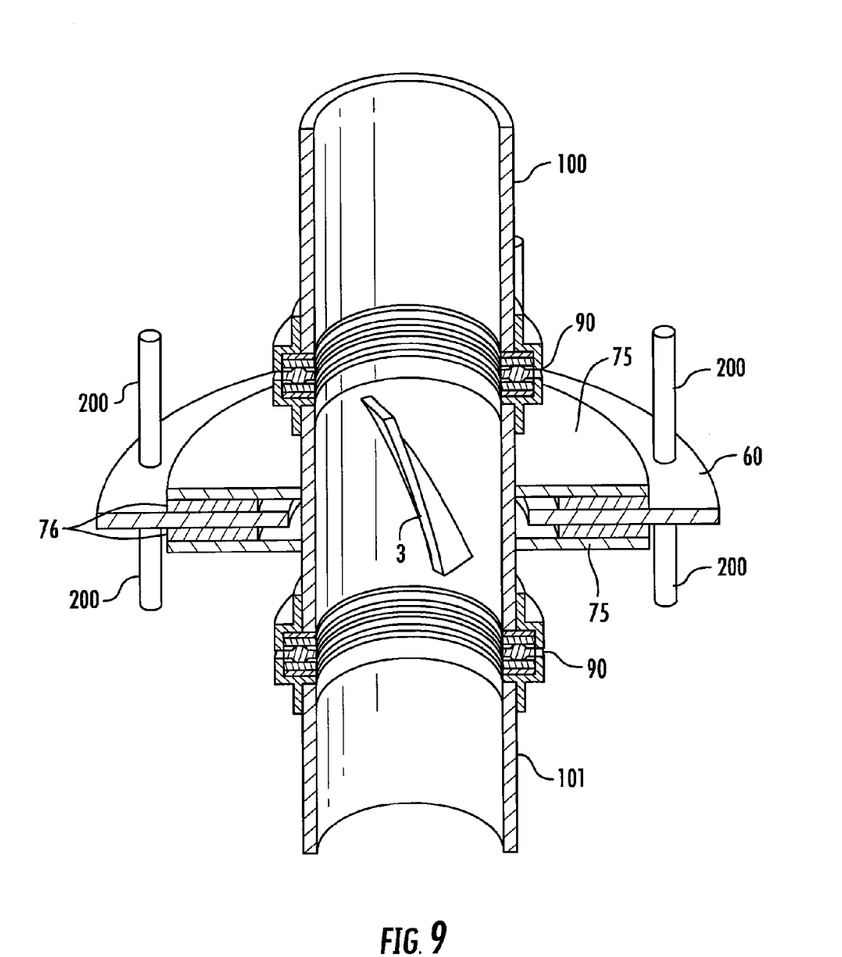
FIG. 9 is a cross section through the generator of FIG. 7.

One embodiment of a generator employing a rotating housing turbine is an axial flux generator, shown in FIGS. 7 and 9. The generator, as shown, is used in a four inch drop line using a two blade rotating housing turbine (see, for instance, FIG. 6), each blade mounted on a 30 degree spiral angle. As shown, the rotator comprises two quarter inch thick carbon steel annular rings 75 containing neodymium magnets 76 (twelve magnets per ring) fixedly mounted to the rotating turbine housing 2, with a gap between the rings 75. The stator, containing the coils, is an annular ring 60 positioned between the two carbon steel rings 75. In one embodiment, the stator is fixedly mounted to the inlet 100 and outlet pipe 101 of the drop structure. Shown in FIG. 9 are mounts 200 on the armature that may be attached to collars one or both of the fixed connecting pipes 100, 101, or mounted to a surrounding structure, such as the basin in which the pipes are located. For use in a drop structure, it may be desirable to have the armature supported by the same cage or sleeve that contains or supports the bearings, to account for proper alignment of the magnets and armature. The generator shown is designed as a three phase generator (3 coils per phase, each coil having seventy-two turns using 18 gauge copper wire, where the coils are epoxied in the center stator annular ring), and used in fluid flows of about ten liters/sec. Single phase generators are also contemplated within the scope of the invention. In this design, the armature is the stator. The axial flux generator is simply one example of possible use of the turbine and the rotating housing turbine may be used in other generator designs, such as induction generators, magnetically-levitated axial flux generator, transverse flux permanent magnet generators (with or without an iron core), wound rotor induction generators, self-excited induction generators, stator converter controlled induction generators, and other generator and alternator designs.

Multiple rotating housing turbine generators may be stacked "vertically" in a drop structure. It may not be preferred to stack one on top of another (separated by suitable bearings), and instead, it may be preferred to have rotating housing turbine generators interspaced with non-rotating pipe sections to allow the spirally flowing wastewater to regain kinetic energy prior to interacting with the next rotating housing turbine. Stacking horizontally in a river or channel or air application is also within the scope of the invention. Instead of stacking two rotating housing turbines, a single rotating housing turbine can be employed with multiple layers of blades. In a fluid flow environment where the fluid does not spiral down the walls of the housing (for instance, in a steam generator), it may be desired to have multiple layers or rows of blades, varying the blade geometry for blades located distant from the fluid inlet. For instance, if the first row of blades has a width of 3 inches, the second and more distant (from the inlet) may have a width of four inches, extending further into the fluid flow to allow capture of additional kinetic energy. However, in a rotating housing turbine, fluid flow will not be uni-directional, as the rotating blades will further impart a tangential velocity component to fluid entering the turbine.

In other applications, the vortex turbine may be supported by a separate structure via suitable bearings (as opposed to being supported by inlet pipe 100 and discharge pipe 101, such as shown in FIG. 3). For instance, in a river or channel application, a stand could be anchored in the channel bottom, and the rotating housing turbine rotatably attached to the stand with suitable bearings; alternatively, a stand could be suspended into the channel, and the rotating housing turbine rotatably attached to the suspended stand in a suitable angular orientation (preferably, the lengthwise axis of the turbine is aligned with the fluid flow of the application environment). In an application where the fluid flow surrounds the turbine (such as within a river channel, or an wind mill application), blades may additionally be mounted on the exterior of the rotating housing (or, in lieu of blades mounted to the interior of the housing, not preferred).

The invention herein includes the novel turbine design, as well as the novel turbine design used as a rotor in an electrical generator, (steam generator, wind generator, water generator, tidal generator, current generator, etc.), generation of power in sewer drop lines, in storm water run off lines, or other fluid flows, for instance, in building drain systems or roof drain systems (e.g., gutters). For instance, within a storm drain system, where water is collected (from, for instance, a street, parking lot, bridge deck, etc) in a well, catch basin or sump, and then directed into a drain pipe system, the rotating housing turbine may be placed with the piping system, or placed vertically in the storm drain sump.

The turbine has no center shaft, and preferably, is open in the center, with no flow obstructions. The turbine can be used as a generator in fluid flows, particularly fluid flows with high fluid velocity along the sidewalls of the fluid transport system, such as in storm water runoff systems and sewer drop lines.

The invention claimed is:

1. The combination of an inlet fluid pipe, an outlet fluid pipe and a generator, mounted between said inlet and outlet pipe, the generator comprising a stator and a rotator, where said stator is mounted to said inlet or said outlet fluid pipe, wherein said rotator comprises a turbine comprising a tubular sidewall defining a cylinder having an open top and open bottom and an interior surface, said tubular sidewall defining a hollow interior from said open top to said open bottom, said hollow interior having a center portion substantially equally distant from said tubular sidewall, said sidewall having a vertical extent from said open top to said open bottom, said sidewall being substantially closed to fluid flow, said turbine further comprising a plurality of blades mounted to said interior surface of said sidewall, said blades offset from one another on said interior surface, each of said blades extending from said interior surface into said hollow interior but not into said center portion, and a bearing coupled to said sidewall to allow said sidewall to rotate about said bearing, said turbine tubular sidewall sealingly and rotatably coupled to said inlet fluid pipe and said outlet fluid pipe, and wherein said inlet fluid pipe is fluidly connected to a source of liquids containing entrained solids and wherein said center portion of said hollow interior is sized to allow expected entrained solids in said liquid to pass through said center portion.

2. The combination of claim 1 wherein said rotator further comprises a series of magnets positioned on said rotator.

3. The combination of claim 1 wherein said stator further comprises a series of coils positioned on said stator.

4. The combination of claim 1 wherein said liquids comprises sewage.

5. The combination of claim 4 wherein said inlet fluid pipe and said outlet fluid pipe are positioned in a sewer drop line.

6. The combination of claim 1 wherein said inlet pipe and said outlet pipe are positioned in a storm drain sump.

7. The combination of claim 1 wherein said cylinder defines a diameter d, and said center portion has a center diameter of about d/2.

* * * * *